Patented Nov. 19, 1929

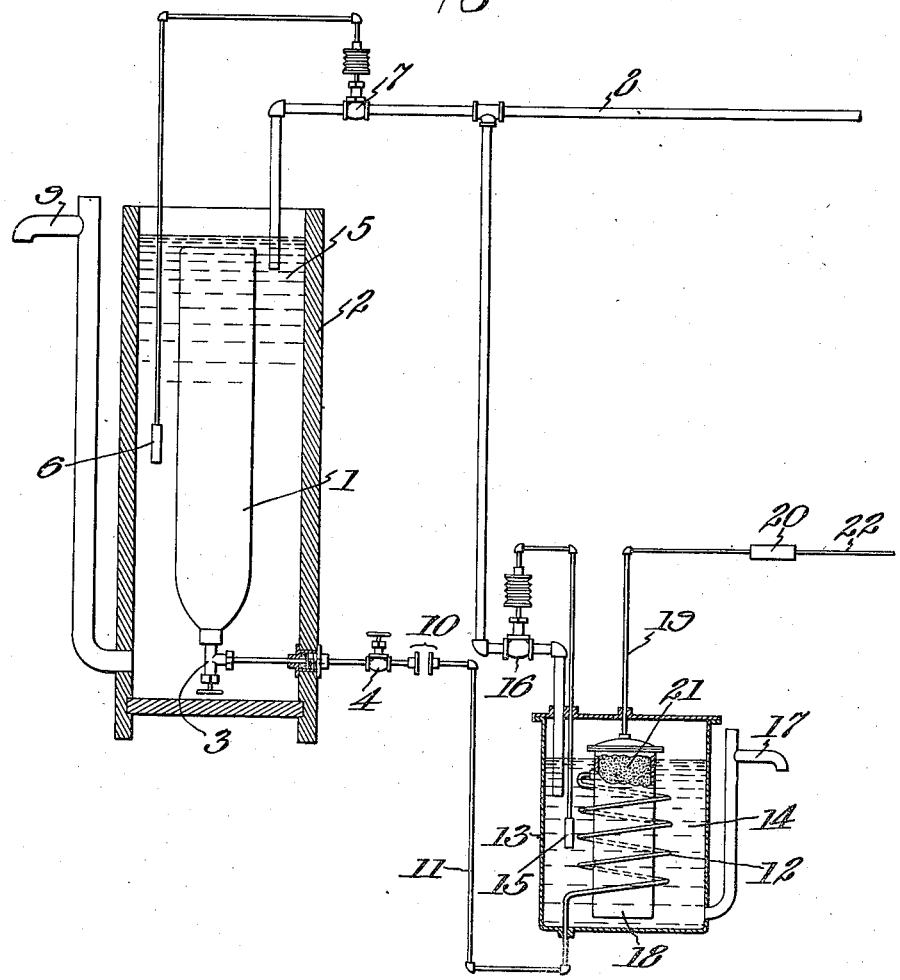

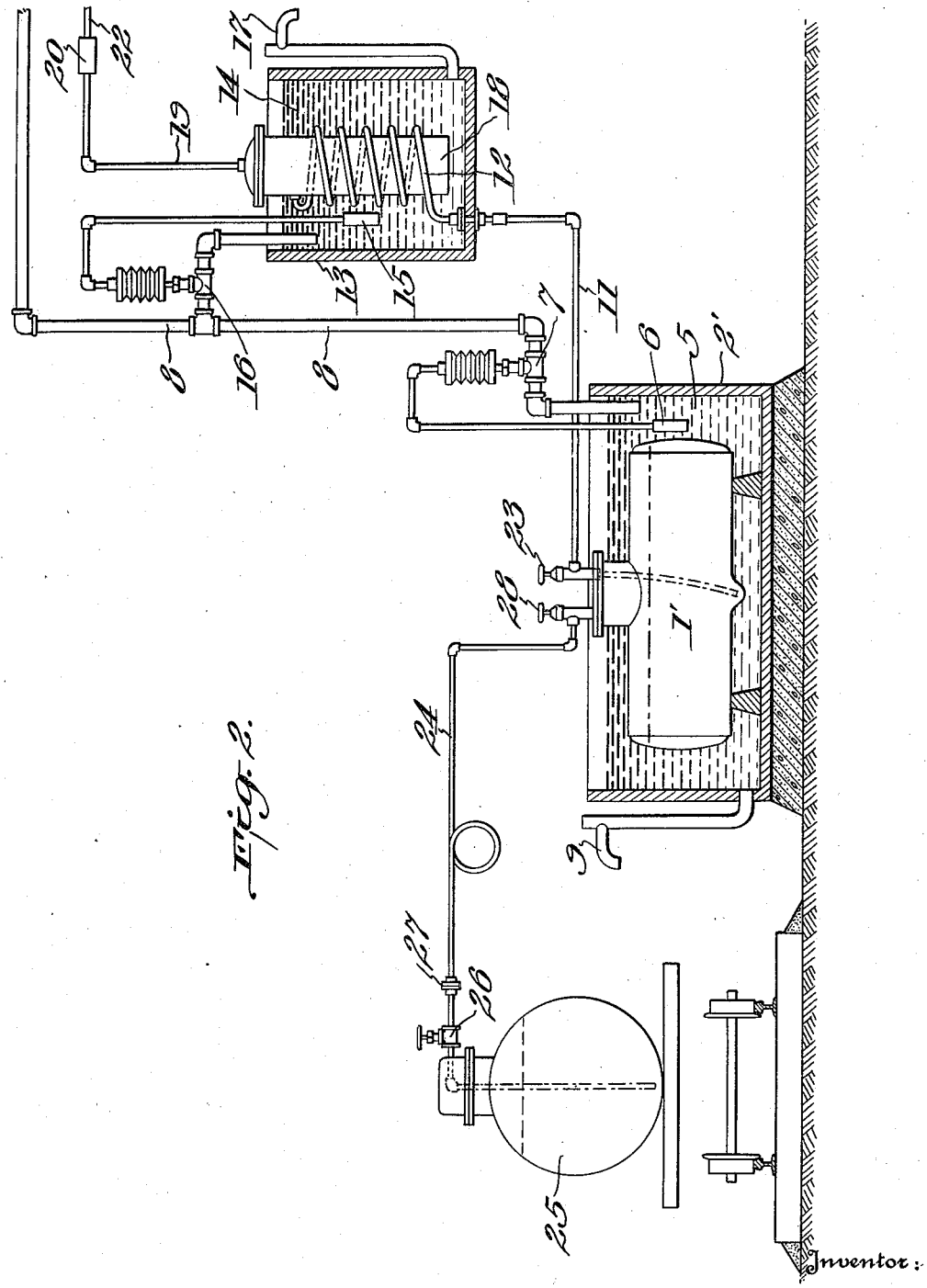

1,736,509

UNITED STATES PATENT OFFICE

JASPER M. ROWLAND, OF NIAGARA FALLS, NEW YORK, ASSIGNOR TO HOOKER ELECTROCHEMICAL COMPANY, OF NEW YORK, N. Y., A CORPORATION OF NEW YORK

PROCESS AND APPARATUS FOR CONTROLLABLY FEEDING GASES

Application filed January 7, 1927. Serial No. 159,733.

This invention relates to a process and apparatus for maintaining a uniformly constant and accurately controllable supply of a gas, and more particularly to such a process and apparatus wherein a gas, in the liquid phase, is drawn from a source of supply where the pressure is controlled by the equilibrium temperature of the liquefied gas.

In the operation of withdrawing in a gaseous state a substance which under normal conditions of temperature and pressure exists in the gaseous state, from a receptacle containing the same in the liquid phase, evaporation takes place within the container and there results a considerable variation in pressure. For example, in the chlorination of municipal water supplies, of sewage, and the like, the chlorine is fed to a stream of fluid at a low, but necessarily constant, rate. Usually the source of supply is chlorine in liquid phase, stored in suitable containers, which under normal temperature conditions may, when first put into service, have a pressure of about 100 pounds per square inch. If gaseous chlorine is withdrawn at a normal rate without properly warming the container the latent heat of vaporization will so chill the contents that the pressure will drop to almost atmospheric. It has become general practice to withdraw gaseous chlorine from such source of supply by means of complicated and difficultly controllable devices designed to reduce the pressure of the vaporized chlorine in relation to atmospheric pressure, and then to feed the said gaseous chlorine to the point of use. These pressure reducing devices are extremely delicate and require considerable oversight to effect constant feed of the gas.

An object of the invention is to provide a simple and efficient method of and apparatus for feeding gases which will overcome the before mentioned objections. The present invention resides in a method of and apparatus for controllably feeding gases, which comprises submerging the container holding the liquefied gas in a body of liquid, maintaining the constant equilibrium pressure of the contents of the container by thermostatic control of the temperature of the body of liquid surrounding the container and continuously transferring the gas in liquid phase from said container to a vaporizing coil immersed in a body of liquid whose thermostatically controlled temperature is maintained at a constant point giving sufficient temperature difference to supply to the liquefied gas such heat as is necessary to counteract the latent heat of vaporization of the gas in such manner that the liquefied gas will evaporate under the pressure controlled by the liquefied gas in the container.

By this method a uniform pressure of the gas is insured while withdrawing the entire contents of the container, and at all times this pressure is under accurate control by means of the thermostatic control of the liquid surrounding the container.

The above and other objects, and the novel features, of the invention will be apparent from the following description taken with the accompanying drawings which are diagrammatic representations, with parts in section, of two forms of apparatus capable of effecting the process herein set out.

In Fig. 1 of the drawing, 1 represents the source of supply of liquefied gas, which may be a cylinder of the conventional type customarily employed in storing and handling liquefied gases such as chlorine, sulphur dioxide, carbon dioxide or the like, or may be any other suitable container. Said container is placed in inverted position in tank 2, with its valve 3 connected by suitable conduit to the valve 4 outside the tank 2. Valve 4 is closed and container valve 3 is opened. The tank 2 is then filled with a body of liquid 5 and, by means of the thermostatic control 6 actuating the valve 7 in the liquid supply line 8, the supply of temperature-controlling liquid passes through valve 7 until the contents of container 1 and the body of liquid 5 are of uniform temperature and equilibrium conditions have been established. The tank 2 is furnished with an overflow pipe 9 for maintaining the body of liquid 5 in uniform volume.

When it is desired to withdraw a supply of gas from the unit, connection 10 is made, the valve 4 opened and the gas, in liquid phase, flows by gravity through the conduit 11 into the vaporizing coil 12 where it is vaporized.

The vaporizing coil 12 is positioned within tank 13 and is immersed in a body of liquid 14 whose temperature is maintained at a point making possible counteracting the latent heat of vaporization of the liquefied gas by means of the thermostat 15 actuating and controlling the thermostatic valve 16 in the liquid supply line 8.

A suitable overflow device 17 is provided for maintaining constant volume of body of liquid 14. The coil 12 enters the tank 18 at a point near the top of the latter. Any gas in liquid phase carried into the tank 18 drops to the bottom and is vaporized by the heat of the surrounding liquid 14. Tank 18 also serves as a trap and as a storage for vaporized gas under the constant equilibrium pressure exerted by the liquefied gas in container 1 governed by the thermostatically controlled temperature of the body of liquid 5.

The dry vaporized gas stored in tank 18 passes out of the latter through conduit 19 to enter the control apparatus 20. It is obvious that a filtering medium 21 may be interposed in the stream of gas, as at the top of tank 18. The duty of control apparatus 20 is greatly simplified because of the fact that the vaporized gas supplied to it may be anhydrous and is delivered under constant conditions of temperature and pressure. The control at 20 may readily be performed by any one of numerous simple devices, such as capillary glass tubes, orifice in glass or platinum discs or other means dependent upon pressure difference and the quantity of gas desired. The vaporized gas, in measured quantity, flows through conduit 22 to the point of use.

As temperature controlling liquids (bodies 5 and 14) I prefer to use the simplest which meets the conditions of the particular operation. Accordingly, warm water, refrigerated brine, ordinary water supply, deep-well water or other operative liquid may serve according to the varying conditions encountered.

Although the above described process has many applications, one application is in those processes for sterilization or purification of water or sewage or the like in which dry gaseous chlorine in relatively small volume is fed in regulated quantity to the stream of fluid to be sterilized or purified.

It is to be understood that various changes, obvious to one skilled in the art, may be made in carrying out this process, and various changes made in the apparatus for effecting said process, without departing from the invention. Thus, it would be obvious to replace the container for liquefied gas 1 by a submerged storage tank piped to the source of supply of liquefied gas. Thus, as indicated in Fig. 2 of the drawing, for the unit comprising the cylinder 1, valve 3, valved conduit 4 and union 10, there may be substituted a liquefied gas storage tank 1' submerged in a body of temperature-controlling liquid 5. In this case, the conduit 11 may extend to just short of the lowest point of tank 1', being connected to said tank by the shut-off valve 23. The conduit 24 connects tank 1', by union connection 27 and shut-off valves 28 and 26 respectively to a source of liquefied gas 25. Further, it would be an obvious expedient to so design the apparatus that a plurality of containers similar to container 1 submerged in individual bodies of liquid 5 having controlled temperature might be used, withdrawing liquefied gas from one or more of such containers while empty containers are being replaced or refilled.

I claim:

1. The method for obtaining a supply of a fluid, in gaseous phase, from a source of supply of said fluid in liquid phase, by the operations of withdrawing said fluid in liquid phase from said source of supply, and vaporizing the same, which comprises maintaining equilibruim pressure conditions throughout said operations.

2. The method as defined in claim 1, wherein the equilibrium pressure conditions of the source of supply of said fluid, in liquid phase, are maintained by surrounding said source of supply with a body of liquid of controlled temperature.

3. The method as defined in claim 1, wherein the withdrawn stream of fluid in liquid phase maintained under equilibrium pressure conditions is vaporized by counteracting the latent heat of vaporization of said fluid by a supply of heat furnished by a body of liquid of controlled temperature surrounding said stream of fluid in liquid phase.

4. Process for maintaining a controllable supply of a fluid, which comprises withdrawing a stream of said fluid, in liquid phase, from a source of supply maintained under equilibrium pressure conditions and vaporizing said withdrawn stream of fluid in liquid phase by supplying to the same sufficient heat to counteract the latent heat of vaporization of said fluid.

5. Process for maintaining a uniform and accurately controllable supply of a fluid which comprises maintaining a source of supply of said fluid, in liquid phase, under equilibrium conditions by surrounding said source of supply with a body of liquid of controlled temperature, withdawing a stream of said fluid, in liquid phase, from said source of supply and vaporizing said stream by counteracting the latent heat of vaporization of said fluid by a supply of heat furnished by a body of liquid, of controlled temperature, surrounding said stream.

6. The method for obtaining a supply of chlorine, in gaseous phase, from a source of supply in liquid phase, which comprises maintaining equilibrium pressure conditions throughout the steps of withdrawing the chlorine in liquid phase from said source of supply and vaporizing the same.

7. Process for maintaining a uniform and accurately controllable supply of chlorine which comprises maintaining a source of supply of said chlorine, in liquid phase, under equilibrium conditions by surrounding said source of supply with a body of liquid of controlled temperature, withdrawing a stream of said liquefied chlorine from said source of supply and vaporizing said stream by counteracting the latent heat of vaporization of said chlorine by a supply of heat furnished by a body of liquid, of controlled temperature, surrounding said stream.

8. Apparatus for obtaining a supply of fluid, in gaseous phase, from a source of supply in liquid phase, comprising means for withdrawing a stream of said fluid in liquid phase from a container, means for maintaining the contents of said container under equilibrium pressure conditions, and means for controllably supplying heat to said stream to counteract latent heat of vaporization of said fluid.

9. Apparatus for delivering a fluid, in gaseous phase, from a source of said fluid, in liquid phase, comprising a tank adapted to receive said source, a conduit for delivering liquid to said tank, means for controlling the supply of liquid to maintain a constant temperature within said tank, a second tank having a heat transfer conduit and a liquid trap therein, means for connecting said heat transfer conduit to the source of said fluid, in liquid phase, in said first tank, a conduit for delivering liquid to said second tank, and means for controlling the supply of liquid to said second tank to maintain a constant temperature within the same.

In testimony whereof, I affix my signature.

JASPER M. ROWLAND.